(12) United States Patent
Rehof et al.

(10) Patent No.: US 7,203,924 B2
(45) Date of Patent: Apr. 10, 2007

(54) BEHAVIORAL ANALYSIS FOR MESSAGE-PASSING APPLICATION PROGRAMS

(75) Inventors: Jakob Rehof, Redmond, WA (US); Sriram K. Rajamani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 10/136,680

(22) Filed: Apr. 30, 2002

(65) Prior Publication Data

US 2003/0204570 A1    Oct. 30, 2003

(51) Int. Cl.
G06F 9/44    (2006.01)

(52) U.S. Cl. .............. 717/104; 717/103; 717/140; 706/46

(58) Field of Classification Search ........ 717/101–113, 717/103–116, 120–121, 117, 119, 124, 140–143, 717/148–150; 709/203; 706/46–47
See application file for complete search history.

(56) References Cited

U.S. PATENT DOCUMENTS

| | | | | | |
|---|---|---|---|---|---|
| 5,388,189 | A | * | 2/1995 | Kung | 706/45 |
| 5,548,756 | A | * | 8/1996 | Tantry et al. | 707/10 |
| 5,572,733 | A | * | 11/1996 | Ryu et al. | 717/104 |
| 5,758,160 | A | * | 5/1998 | McInerney et al. | 717/104 |
| 5,960,200 | A | * | 9/1999 | Eager et al. | 717/147 |
| 5,991,538 | A | * | 11/1999 | Becker | 717/140 |
| 6,118,448 | A | * | 9/2000 | McMillan et al. | 717/127 |
| 6,233,620 | B1 | * | 5/2001 | Gish | 709/203 |
| 6,266,805 | B1 | * | 7/2001 | Nwana et al. | 717/104 |
| 6,314,555 | B1 | * | 11/2001 | Ndumu et al. | 717/101 |
| 6,405,363 | B1 | * | 6/2002 | Carlson et al. | 717/100 |
| 6,421,681 | B1 | * | 7/2002 | Gartner et al. | 707/103 R |
| 6,434,598 | B1 | * | 8/2002 | Gish | 709/203 |
| 6,535,864 | B1 | * | 3/2003 | Zahn | 706/47 |
| 6,631,362 | B1 | * | 10/2003 | Ullman et al. | 706/60 |
| 6,813,761 | B1 | * | 11/2004 | Das et al. | 717/132 |
| 6,826,579 | B1 | * | 11/2004 | Leymann et al. | 717/131 |

(Continued)

OTHER PUBLICATIONS

Niu et al, "Composale semantics fro model based noations", ACM SIGSOFT, pp. 149-158, 2002.*

(Continued)

*Primary Examiner*—Anil Khatri
(74) *Attorney, Agent, or Firm*—Merchant & Gould P.C.

(57) ABSTRACT

A system and method for modeling a message-passing program module using type annotations is disclosed. The message-passing program module is constructed with operations that communicate with operations of other message-passing program modules in an asynchronous computing environment. Type annotations are communication protocols that represent processes of input and/or output actions that the program module developer expects each operation to perform or take on a selected set of communication channels. During development of the program module, the type annotations are declared at each operation of the program module. Soundness of the type annotations and whether implementation of the program module conforms to the type annotations is checked using a type system. If the program module is well-typed and well-implemented, the type system abstracts a behavioral module of the message-passing program module that reflects the relevant processes expressed by the type annotations. A model checker determines whether the behavioral module is in fact a valid abstraction of the implementation, and if so, evaluates one or more properties of the behavioral module to render a conclusion about these properties for the program module.

29 Claims, 9 Drawing Sheets

U.S. PATENT DOCUMENTS

| | | | |
|---|---|---|---|
| 6,842,894 B1* | 1/2005 | Havemose | 717/148 |
| 6,904,588 B2* | 6/2005 | Reddy et al. | 717/104 |
| 6,904,590 B2* | 6/2005 | Ball et al. | 717/132 |
| 6,907,395 B1* | 6/2005 | Hunt et al. | 703/21 |
| 6,968,535 B2* | 11/2005 | Stelting et al. | 717/104 |
| 6,981,249 B1* | 12/2005 | Knoblock et al. | 717/141 |

OTHER PUBLICATIONS

Jurjens, "A UML statecharts semntics with message passing", ACM SAC, pp. 1009-1013, 2002.*

Mehra et al, "A comparision of two model based performance prediction techniques for message passing parallel programs", ACM SIGMETRICS, pp. 181-190, 1994.*

Chaki et al, "Types as models model checking message passing programs", ACM POPL, pp. 45-57, 2002.*

Jaroodi et al, "An object passing model for parallel programming", IEEE COMPSAC, pp. 138-143, 2003.*

Grieskamp et al, "A schema language for coordinating construction and composition of partial behavior descriptions", ACM SCESM, pp. 59-65, 2006.*

Ellis et al, "Extending the behavioral capabilities of the object oriented paradigm with an active model of progation", ACM pp. 319-325, 1990.*

Ghelli, A static type system for message passing:, ACM OOPSLA, pp. 129-145, 1991.*

M. Abadi and L. Lamport. The Existence of Refinement Mappings. In LICS 88: Logic in Computer Science, pp. 165-175. IEEE Computer Society Press, 1988.

E. Brinksma, B. Jonsson, and F. Orava. Refining Interfaces of Communicating Systems. In TAPSOFT 91: Theory and Practice of Software Development, LNCS 494, pp. 297-312. Springer-Verlag, 1991.

Customer Support Consortium (CSC) and Desktop Management Task Force (DMTF). Service Incident Exchange Standard (sis) Specification, version 1.1. Technical report, DMTF. Available at www.dmtf.org.

C. Fournet, F. Le Fessant, L. Maranget, and A. Schmitt. The JoCaml language beta release, documentation and user's manual. Technical report. INRIA, Jan. 2001. Available at pauillac.inria.fr/jocaml/htmlman.

C. Fournet and G. Gonthier. The Join calculus: a language for distributed mobile programming. In Lecture Notes for Applied Semantics Summer School, Caminha Sep. 2000.

Abadi, M. and Lamport, L., "Composing Specifications", *ACM Transactions on Programming Languages and Systems*, 15(1):73-132, 1993.

Abadi, M. and Lamport, L., "Conjoining Specifications", *ACM Transactions on Programming Languages and Systems*, 17(3):507-534, 1995.

Agha, Gul A., *Actors: A Model of Concurrent Computation in Distributed Systems*, The MIT Press, 1988.

Alur, R. and Henzinger T., "Reactive Modules", *Proceedings of the 11th Annual Symposium on Logic in Computer Science*, pp. 207-218, IEEE Computer Society Press, 1996.

Alur, R., Henzinger, T., Kupferman, O. and Vardi, M., "Alternating Refinement Relations", *CONCUR 98: Concurrency Theory*, LNCS 1466, pp. 163-178, Springer-Verlag, 1998.

Alur, R., Henzinger, T.A., Mang, F.Y.C., Qadeer, S., Rajamani, S.K. and Tasiran, S., MOCHA: Modularity in Model Checking, *Computer Aided Verification*, LNCS, pp. 521-525, Springer-Verlag, 1998.

Amtoft, Torben; Nielson, Flemming and Nielson, Hanne R., *Type and Effect Systems, Behaviours for Concurrency*, Imperial College Press, 1999.

Christensen, S., Hirshfeld, Y., and Moller, F., "Decidable Subsets of CCS", *The Computer Journal*, 37(4):233-242, 1994.

Clarke, Edmund M. Jr., Grumberg, Orna, and Peled, Doron A., *Model Checking*, MIT Press, 1999.

Cleaveland, R., Parrow, J., and Steffen, B., "The Concurrency Workbench: A Semantics-Based Tool for the Verification to Concurrent Systems", *ACM Transactions on Programming Languages and Systems*, 15(1):36-72, 1993.

de Alfaro, L. and Henzinger, T., "Interface Theories for Component-Based Design", *EMSOFT 01 Embedded Software*, LNCS, Springer-Verlag, 2001.

Dill, David L., *Trace Theory for Automatic Hierarchical Verification of Speed-Independent Circuits*, MIT Press, 1989.

Dwyer, M., Hatcliff, J., Joehanes, R., Laubach, S., Pasareanu, C., Visser, R.W. and Zheng, H., "Tool-Supported Program Abstraction for Finite-State Verification", *ICSE 01: Software Engineering (to appear)*, 2001.

Eiriksson, A., "The Formal Design of 1M-Gate ASICs", G. Gopalakrishnan and P. Windley, editors, *FMCAD 98: Formal Methods in Computer-Aided Design*, Lecture Notes in Computer Science 1522, pp. 49-63, Springer-Verlag, 1998.

Feret, J., "Confidentiality Analysis of Mobile Systems", *Proceedings of the International Static Analysis Symposium (SAS'00)*, Springer LNCS 1824, 2000.

Flanagan C., and Freund, S.N., "Type-Based Race Detection for Java", *ACM Symposium on Applied Computing*, pp. 219-232, ACM, 2000.

Flanagan, C. and Abadi, M., "Types for Safe Locking", *Proceedings of ESOP 1999*, pp. 91-108, Springer LNCS 1576, 1999.

Fournet, C. and Gonthier, G., "The Reflexive CHAM and the Join-Calculus", *POPL 96: Principles of Programming Languages*, pp. 372-385, ACM, 1996.

Gordon, A. and Jeffrey, A., Typing Correspondence Assertions for Communication Protocols, *MFPS: Mathematical Foundations of Programming Semantics*, pp. 99-120, BRICS Notes Serial NS-01-2, 2001.

Gosling, James; Joy, Bill; Steele, Guy and Bracha, Gilad, *The Java™ Language Specification*, Addison-Wesley, 1996.

Hardin, R., Har'El, Z., Kurshan, R., "COSPAN", *Computer Aided Verification*, LNCS 1102, pp. 423-427, Springer-Verlag, 1996.

Henzinger, T., Liu, X., Qadeer, S., and Rajamani, S., "Formal Specification and Verification of a Dataflow Processor Array", *Proceedings of the International Conference on Computer-Aided Design*, pp. 494-499, IEEE Computer Society Press, 1999.

Henzinger, T., Qadeer, S. and Rajamani, S., You Assume, We Guarantee: Methodology and Case Studies, *CAV 98: Computer Aided Verification*, LNCS 1427, pp. 440-451, Springer-Verlag, 1998.

Henzinger, T.A., Qadeer, S., Rajamani, S.K. and Tasiran, S., "An Assume-Guarantee Rule for Checking Simulation", *FMCAD 98: Formal Methods in Computer-Aided Design*, LNCS 1522, pp. 421-432, Springer-Verlag, 1998.

Hoare, C., *Communicating Sequential Processes*, Prentice Hall, 1985.

Holzmann, G., "The Model Checker SPIN", *IEEE Transactions on Software Engineering*, 23(5):279-295, May 1997.

Holzmann, Gerard J., *Design and Validation of Computer Protocols*, Prentice Hall, 1991.

Holzmann, G., Logic Verification of ANSI-C Code with Spin, *SPIN 00: SPIN Workshop*, LNCS 1885, pp. 131-147, Springer-Verlag, 2000.

Honda, K., Vasconcelos, V.T. and Kubo, M., "Language Primitives and Type Discipline for Structured Communication-Based Programming", *ESOP 98*, Springer, 1998.

Igarashi, A. and Kobayashi, N., "A Generic Type System for the Pi-Calculus", *Proceedings POPE 2001, 28th ACM SIGPLAN-SIGACT Symposium on Principles of Programming Languages, London, UK*, pp. 128-141, Jan. 2001.

Karp, R.M. and Miller, R.E., "Parallel Program Schemata", *Journal of Computer and System Sciences*, 3:147-195, 1969.

Lamport, L., "Proving the Correctness of Multiprocess Programs", *IEEE Transactions on Software Engineering*, SE-3(2):125-143, 1977.

Larsen, K.G. and Milner, R., "A Compositional Protocol Verification Using Relativized Bisimulation", *Information and Computation*, 99:80-108, 1992.

McMillan, K., A Compositional Rule for Hardware Design Refinement, *Computer Aided Verification, CAV '97*, LNCS 1254, pp. 24-35, Springer-Verlag, 1997.

Milner, Robin, *Communicating and Mobile Systems: the π-Calculus*, Cambridge University Press, 1999.

Milner, Robin, "A Theory of Type Polymorphism in Programming", *Journal of Computer and System Sciences*, vol. 17, 1978, pp. 348-375.

Misra, J. and Chandy, K., "Proofs of Networks of Processes", *IEEE Transactions on Software Engineering*, SE-7(4):417-426, 1981.

Najjar, W.A., Lee, E.A. and Gao, G.R., "Advances in the Dataflow Computational Model", *Parallel Computing*, 25:1907-1929, 1999.

Nielson, H.R. and Nielson, F., "Higher-Order Concurrent Programs with Finite Communication Topology", *POPL, ACM Symposium on Principles of Programming Languages*, pp. 84-97, ACM 1994.

Pierce, B.C. and Turner D., Pict: A Programming Language Based on the Pi-Calculus, *Proof, Language and Interaction: Essays in Honour of Robin Milne*, Eds: G. Plotkin, C.P. Stirling and Mads Tofte, MIT Press, 2000.

Puntigam, F. and Peter, C., Changeable Interfaces and Promised Messages for Concurrent Components, *ACM Symposium on Applied Computing*, pp. 141-145, ACM, 1999.

Ravara, A. and Vasconcelos, V., "Typing Non-Uniform Concurrent Objects", *Proceedings of CONCUR 2000*, pp. 474-488, Springer LNCS 1877, 2000.

Roscoe, A.W., *The Theory and Practice of Concurrency*, Prentice Hall, 1998.

Sangiorgi, D., "π-Calculus Internal Mobility, and Agent-Passing Calculi", *Theoretical Computer Science*, 167(2), 1996.

Sangiorgi, D., "A Theory of Bisimulation for the π-Calculus", *Acta Informatica*, pp. 69-97, vol. 33, 1996.

Scaife, N.R., "A Survey of Concurrent Object-Oriented Programming Languages", Technical Report, Heriot-Watt University, 1996.

Schneider, F., "Enforceable Security Policies", *ACM Transactions on Information and System Security*, 3(1):30-50, Feb. 2000.

Stallings, William Ph.D., *Handbook of Computer-Communications Standards*, vol. 2, 2nd Ed., A. Stallings/MacMillan, 1990.

Vardi, M. and Wolper, P., "An Automata-Theoretic Approach to Automatic Program Verification", *LICS 86: Logic in Computer Science*, pp. 332-344, IEEE Computer Society Press, 1986.

Visser, W., Havelund, K., Brat, G. and Park, S., "Model Checking Programs", *ICASE 00: Automated Software Engineering*, 2000.

Yoshida, N., "Graph Types for Monadic Mobile Processes", *FST-TCS: Software Technology and Theoretical Computer Science*, *LNCS 1180*, pp. 371-387, Springer-Verlag, 1996.

\* cited by examiner

BEHAVIORAL ANALYSIS FOR MESSAGE-PASSING APPLICATION PROGRAMS

RELATED APPLICATIONS

This application is related to subject matter disclosed in U.S. patent application for a "PROGRAMMING MODEL FOR CONCURRENT PROGRAMS," Ser. No. 10/136,596, filed concurrently herewith, the subject matter of which is incorporated in this application by reference.

TECHNICAL FIELD

The present invention relates to concurrent software programs, and more specifically to evaluating behavioral properties of concurrent software programs.

BACKGROUND OF THE INVENTION

Software programming has changed over the years as computer programs have moved away from a sequential model of performing operations and toward a more asynchronous model wherein multiple operations of a single program may be performed substantially simultaneously. These computer programs are typically referred to as "event-driven" programs in that a user may initiate an event in the program and thereafter fail to take any other action with respect to that event for an indefinite period of time. As such, the program is in a waiting pattern in which the program takes no action with respect to this event until the user initiates such. During this interim, the user may initiate any number of other events in the computer program, take any number of other actions with respect to these other events, or perform no action during this interim.

Event-driven programs may perform any number of internal operations while waiting for the user to take action with respect to the initiated event or while the user is currently taking action with respect to that or any other event. That is, these programs do not execute tasks and perform operations in a sequential manner, but rather, in a concurrent manner wherein tasks and operations are performed substantially simultaneously with respect to each other. For instance, in a word processor having a graphical user interface, a user may select a control for formatting text in a document using a word processor application program. Meanwhile, between selection of the control and action by the user in the document utilizing the formatting function activated by the control, an auto save feature of the processor may be activated by an internal call initiated by the word processor application. The auto save and formatting operations thus execute logically in a concurrent manner, i.e., "concurrently," with each other in the word processor.

The increasing use of distributed computing environments further illustrates the aforementioned transition in software programming. In distributed computing environments, multiple computer programs communicate with one another by passing messages over channels through which the programs are operably connected using some form of network connection, such as a Local Area Network, Wide Area Network, the Internet, or the like. A distributed computing environment may contain various application programs running on multiple computing systems. These application programs are operable to communicate with any number of application programs connected over the same network or possibly another network connection. Application programs, or instances thereof, in a distributed computing environment often await communications from other application programs. During this indefinite wait period, an application program may continue to perform operations, such as communicating with other application programs by sending and/or receiving messages. Consequently, application programs operating in a distributed computing environment perform tasks and operations in a concurrent manner that is similar to the event-driven application programs described above.

Collectively, application programs operating in a distributed computing environment and event-driven application programs may be referred to as "concurrent," or "message-passing" applications. Although message-passing applications provide many functional advantages over sequential application programs, message-passing applications are not without problems. One common problem associated with message-passing application programs is deadlock. Deadlock is an error that may occur in many situations, but most frequently, in situations where an expected action for an operation never occurs. For instance, deadlock may occur when a message sent by a sender (caller) is never received by a receiver (callee). Likewise, deadlock may occur when a receiver waits for a message that is never actually sent by a sender.

Together with deadlock errors, asynchrony and nondeterminism introduced by the unpredictable nature of when message-passing applications may render a specific action make message-passing applications more difficult to write, debug, test and tune than applications operating in a sequential manner. Today's programming languages and tools currently offer little or no support for concurrent programming. Indeed, known methods for evaluating, or checking, behavioral properties of a message-passing application program are extremely difficult and time-consuming. Moreover, there are no current modeling techniques that accurately address the problems of detecting deadlock errors.

In hardware and protocol design, there has been relative success in modeling different agents as communicating finite state machines and thereafter using model checking to explore the interactions, i.e., behavioral properties, between the agents. As such, a model is defined for the processes of the hardware as a whole. Similar agents in concurrent software, which are commonly referred to as asynchronous functions, or operations, tend to have more complicated communication structure than agents in hardware. Indirect references and dynamic creation of new objects and functions play a prominent role in the interaction between software agents. For instance, one operation can create a new object and send a reference for the object to a second operation. Following this, both operations can read or change the contents of the object. Such interactions are typically difficult to model using communicating finite state machines. In addition, a fundamental obstacle in checking behavioral properties, such as deadlock freedom and communication progress, between software agents is the exponential state space explosion resulting in model checking.

SUMMARY OF THE INVENTION

In accordance with the present invention, the above and other problems are solved by a behavioral analysis system for evaluating behavioral properties of a message-passing program module. The behavioral analysis system includes a type system that receives an implementation for the message-passing program module and thereafter checks whether the implementation conforms to an intended set of type processes. The type processes are expressed using type annotations that are placed in the source code of the message-passing program module by the program module developer. The type processes specify certain message-passing actions that the implementation is to perform as well as communication channels restricted for the actions. If the implementation conforms to the intended set of type processes, the type system abstracts a behavioral module for the message-passing program module that reflects all type processes expressed using type annotations included in the program module source code. The behavioral analysis system includes a model checker that checks whether the behavioral module is a valid abstraction for the implementation of the message-passing program module. If the behavioral module is deemed a valid abstraction for the implementation, various behavioral properties of the message-passing program module may be evaluated by performing a behavioral analysis on the behavioral module.

In accordance with other aspects, the present invention relates to a method for modeling behavior of a message-passing program module. The message-passing program module is constructed with one or more operations that are responsible for establishing communications between the message-passing program module and other message-passing program modules. The method includes specifying type annotations for each operation of message-passing program module. Type annotations are communication protocols that represent processes of input and/or output actions that the program module developer expects each operation to perform or take on a selected set of communication channels. The method checks, in modular fashion, whether an implementation of the message-passing program module conforms to the specified behavior of the type annotations.

In accordance with yet other aspects, the present invention relates to a method for evaluating behavioral properties of a message-passing program module. The method models behavior of the message-passing program module by specifying type annotations at operation declarations in the source code of the message-passing program module. The method abstracts a behavioral module of the type processes from the type annotations and checks whether the behavioral module is a valid abstraction of an implementation for the message-passing program module. In checking whether the behavioral module is a valid abstraction of the implementation, the method applies assume-guarantee reasoning to verify open simulation assumptions made of the type processes. If the behavioral module is deemed a valid abstraction of the implementation, the method may evaluate the behavioral module to render a conclusion concerning behavioral properties associated with the implementation of the message-passing program module.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
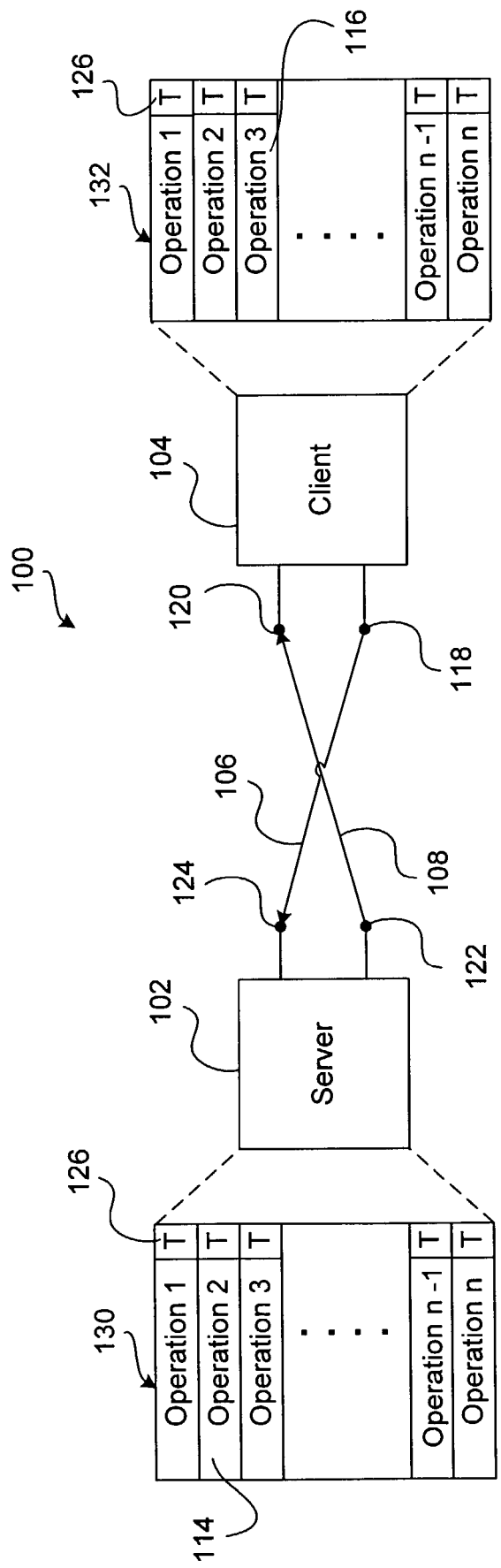
FIG. 1 is a functional diagram of a message-passing computing environment that incorporates aspects of the present invention.

An asynchronous computing environment 100 incorporating aspects of the present invention is shown in FIG. 1. The environment 100 has a server program module 102 and a client program module 104. As described above, the present invention relates to message-passing program modules that operate in either a distributed computing environment in accordance with a first embodiment or in a local computing environment as event-driven program modules loaded on a single computing system in accordance with another embodiment. Alternative embodiments may comprise elements of both a message-passing program modules in a distributed computing environment and in a local computing environment.

In accordance with a first embodiment, the environment 100 is a distributed computing environment wherein the server program module 102 and the client program module 104 are software application programs resident on separate computing systems that communicate over a form of network connection, such as, without limitation, a Local Area Network (LAN), a Wide Area Network (WAN), the Internet, or the like. For example, the distributed environment 100 may be a workflow environment where the client program module 104 calls the server program module 102 to request performance of a task by the server program module 102. As described in more detail below, an instance (not shown) of the server program module 102 is created in response to the call by the client program module 104. The instance is responsible for performing the task requested by the client program module 104 and thereafter responding to the client program module 104 that the task has been completed.

During the time that the client program module 104 waits for a response from the server program module 102, the client program module 104 may make any number of similar calls to other program modules to which the client program module 104 communicates over the network connection. Likewise, any number of other client program modules 104 may contact the server program module 102, create instances of the server program module 102 and communicate with these instances concurrently with the instance created by the client program module 104. For simplicity, though, only the client program module 104 and the server program module 102 are depicted in FIG. 1.

In accordance with a second embodiment of the present invention, the server program module 102 may be an event-driven application program resident on the same computing system as the client program module 104. As such, the server program module 102 and the client program module 104 may pass communications over a communication bus resident in the computing environment 100. Communication buses are well known to one of ordinary skill in the computing and communication arts, and therefore not described in detail herein. In this embodiment, as one example, the server program module 102 provides a user with a graphical user interface (GUI) that enables the user to select controls for activating events in the server program module 102. An event, when activated, performs some function or operation within the server program module 102. The user interacts, i.e., selects events, with the GUI of the server program module 102 using a keyboard and/or conventional mouse operably connected to the client program module 104, which in this case, is simply an application program for interpreting keyboard and mouse selections. Upon selection of an event, the client program module 104 calls the operation in the server program module 102 corresponding to the event and an instance of the operation is created to perform the event. Any number of instances of the selected operation or any other operation within the server program module 102 may operate concurrently with one another.

In accordance with yet another embodiment of the present invention, the client program module 104 and the server program module 102 may be either stages of message-passing application programs in a distributed computing environment 100 or stages of the same event-driven application program in a local computing environment 100. Thus, the client program module 104 may be referred to as a client stage and the server program module 102 may be referred to as a server stage. Generally, a stage is a collection of asynchronous functions, referred to herein as operations, which share a common memory, together with statements that import operation names from other stages and export operation names to other stages. Operations on separate stages cannot share memory, and thus operations on the client stage 104 communicate with operations on the server stage 102 by sending and receiving messages, i.e., asynchronous calls, therebetween.

Stages thus form the concurrent building blocks for message-passing application programs. In an embodiment where the environment 100 is a local computing environment, the event-driven application program is built using the client stage 104 and the server stage 102, and may constructed using any number of other stages containing operations for the program. In an embodiment where the environment 100 is a distributed computing environment, the client stage 104 is a stage of a first message-passing application program and the server stage 102 is a stage of a second message-passing application program, wherein the first message-passing application program and the second message-passing application program are program modules of separate computing systems.

The server program module 102 and the client program module 104 are constructed using source code, such as a server source code listing 130 and a client source code listing 132, respectively. In accordance with an embodiment of the present invention, the source code listings 130 and 132 are expressed as a pi-calculus mathematical expression. Pi-calculus is a mathematical reasoning tool that may be used to model message-passing actions and other behavioral properties of program modules, such as 102 and 104. In providing a means for modeling such behavioral interactions between processes, pi-calculus reasoning combines fresh name generation and higher order channel passing to enable modeling of normally complex communication patterns between processes. The syntax and semantics of, and the theorems behind, pi-calculus as well as the application of pi-calculus to modeling computer application programs are well known in the art and therefore not described in detail.

The server source code listing 130 and the client source code listing 132 are constructed with various operations, such as the server operation 114 and the client operation 116, respectively. The operations 114 and 116 are responsible for providing communication and synchronization mechanisms to connect the server program module 102 to the client program module 104 during communications. As source code for a program module 102 or 104 is invoked, compiled or otherwise executed, an implementation for the source code is created that reflects the message-passing actions actually taken or performed by the module 102 or 104. Thus, invoking, compiling or otherwise executing source code for a program module is referred to herein as "implementing" the code.

Illustrating communications between the server program module 102 and the client program module 104, a client operation 116, referred to as a "caller," makes an asynchronous call to a server operation 114, thereby creating an instance, referred to as a "callee," of the server operation 114. The callee executes operations in parallel, i.e., substantially simultaneously, with the caller. The caller 116 and callee 114 communicate with one another through communication channels, such as a first channel 106 and a second channel 108. The channels 106 and 108 are specified by the caller 116 in the asynchronous call and may only be used for input, or alternatively, output, by the callee. Indeed, a single channel (106 or 108) may not be used for both input and output by the callee. More specifically, the first channel 106 and the second channel 108 are each declared with usage mode qualifiers indicating whether that channel can be used for input or output by the callee. An input port 120 and an output port 118 provide physical connections that enable the client program module 104, and thus the caller 116 to access the second channel 108 and the first channel 106, respectively. Likewise, an input port 124 and an output port 122 provide physical connections that enable the server program module 102, and thus the callee to access the first channel 106 and the second channel 108, respectively.

In accordance with an embodiment of the present invention, type annotations 126 that specify intended message-passing behavior of the implementations for the program modules 102 and 104 are included in the source code listings 130 and 132 for the program modules 102 and 104, respectively. Type annotations 126 are communication protocols that represent the input and/or output actions that the program module developer expects each operation to perform or take on a selected set of communication channels. Type annotations 126 are calculus communicating system (CCS) process expressions defined by the program module developer that specify the intended message-passing actions to be performed or taken by each operation as a particular program module, such as 102 and 104, is implemented. In accordance with alternative embodiments, the type annotation 126 may be declared using any other mathematical expression tool or computer programming language that enables a programmer to model message-passing actions for an operation of an application program under development. The program module developer may place the type annotations in the source code listings 130 and 132 at the declaration of each operation 114 and 116, and more specifically at the end of the declaration for each operation 114 and 116. Type annotations may also be referred to as behavioral type signatures or behavioral type specifications.

During compilation of a program module 102 or 104, the present invention checks each operation 114 or 116 of the module 102 or 104 against a "type" process expressed by the associated type annotation 126 to evaluate whether the implementation performs consistently with the processes expressed by all type annotations 126 specified for the module 102 or 104. If the implementation performs consistently with all type annotations, the present invention abstracts a behavioral module for the program module 102 or 104. The behavioral module is a calculus communicating system (CCS) process that reflects a complete model of the message-passing behavior specified by the type annotations 126 for the program module 102 or 104. The present invention checks the behavioral module to determine whether the module is a valid abstraction of the implementation. If the behavioral module is indeed a valid abstraction of the implementation, the present invention may evaluate the behavioral module to render a conclusion about various behavioral properties of the implementation of the program module 102 or 104. For instance, such an evaluation may provide a conclusion that the potential for deadlock of communications to and from the program module during implementation is minimal. A model checker may be used to perform such an evaluation.

Figure 2:
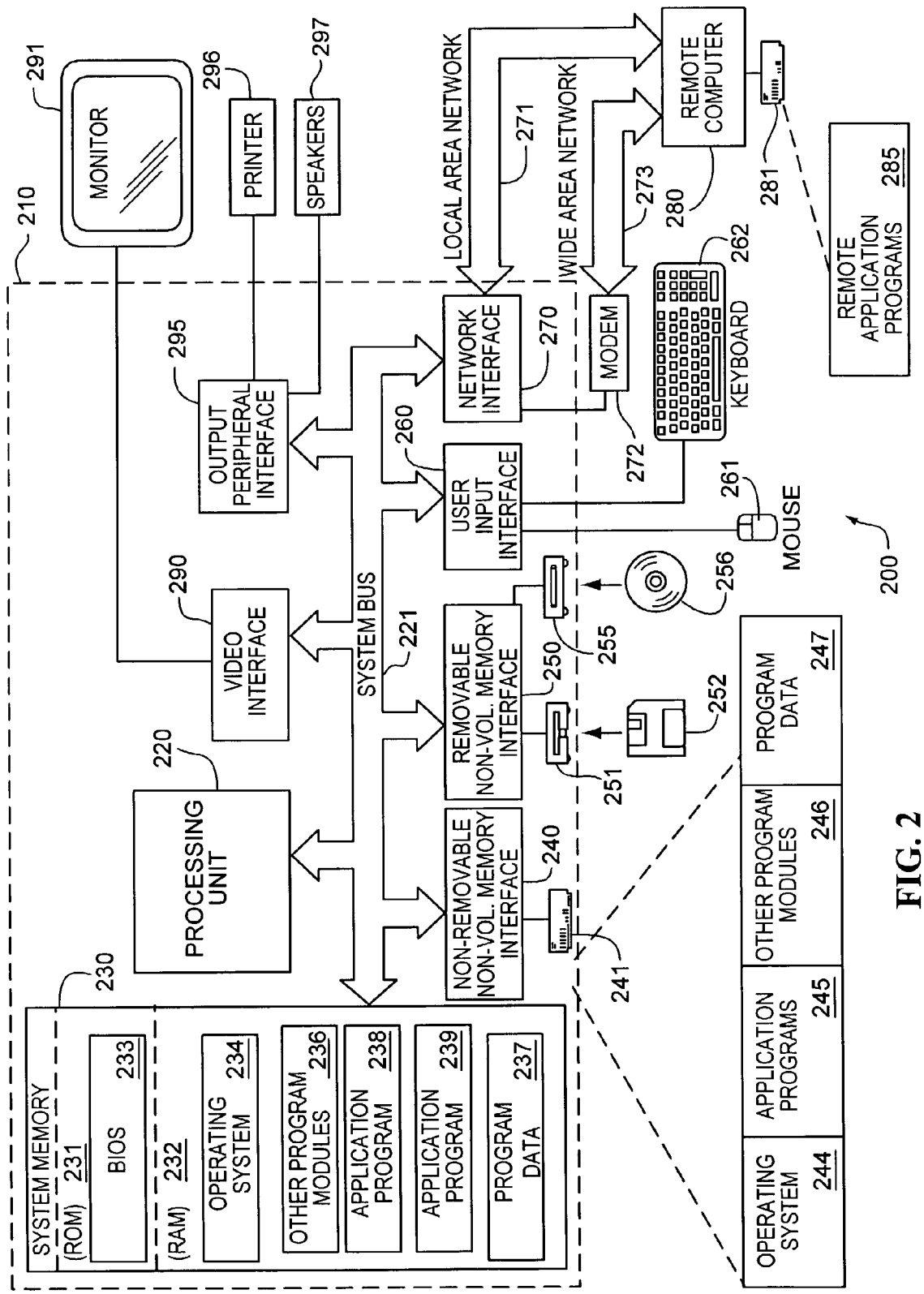
FIG. 2 shows a computer system that may be used according to particular aspects of the present invention.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. In accordance with an embodiment, the invention is practiced in a distributed computing environment, such as the environment 100 shown in FIG. 1, in which tasks are performed by remote processing devices that are linked through a communications network. In such a distributed computing environment, program modules may be located in both local and remote computer storage media including memory storage devices.

With reference to FIG. 2, an exemplary system for implementing the invention includes a general purpose computing device in the form of a computer 210. Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates an operating system 234, application programs 238 and 239, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, the hard disk drive 241 is illustrated as storing an operating system 244, application programs 245, other program modules 246, and program data 247. Note that these components can either be the same as or different from the operating system 234, the application programs 238 and 239, the other program modules 236, and the program data 237. The operating system 244, the application programs 245, the other program modules 246, and the program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Although many other internal components of the computer 210 are not shown, those of ordinary skill in the art will appreciate that such components and the interconnection are well known. Accordingly, additional details concerning the internal construction of the computer 210 need not be disclosed in connection with the present invention.

Those skilled in the art will understand that program modules such as the operating system 234, the application programs 238 and 239, and data 237 are provided to the computer 210 via one of its memory storage devices, which may include ROM 231, RAM 232, the hard disk drive 241, the magnetic disk drive 251 or the optical disk drive 255. As noted above, the hard disk drive 241 is used to store data 237 and programs, including the operating system 234 and the application programs 238 and 239.

When the computer 210 is turned on or reset, the BIOS 233, which is stored in the ROM 231 instructs the processing unit 220 to load the operating system 244 from the hard disk drive 241 into the RAM 232. Once the operating system 244 is loaded in RAM 232, the processing unit 220 executes the operating system code and causes the visual elements associated with the user interface of the operating system 244 to be displayed on the monitor 291. When a user opens an application program, the program code and relevant data are read from the hard disk drive 241 and stored in RAM 292.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
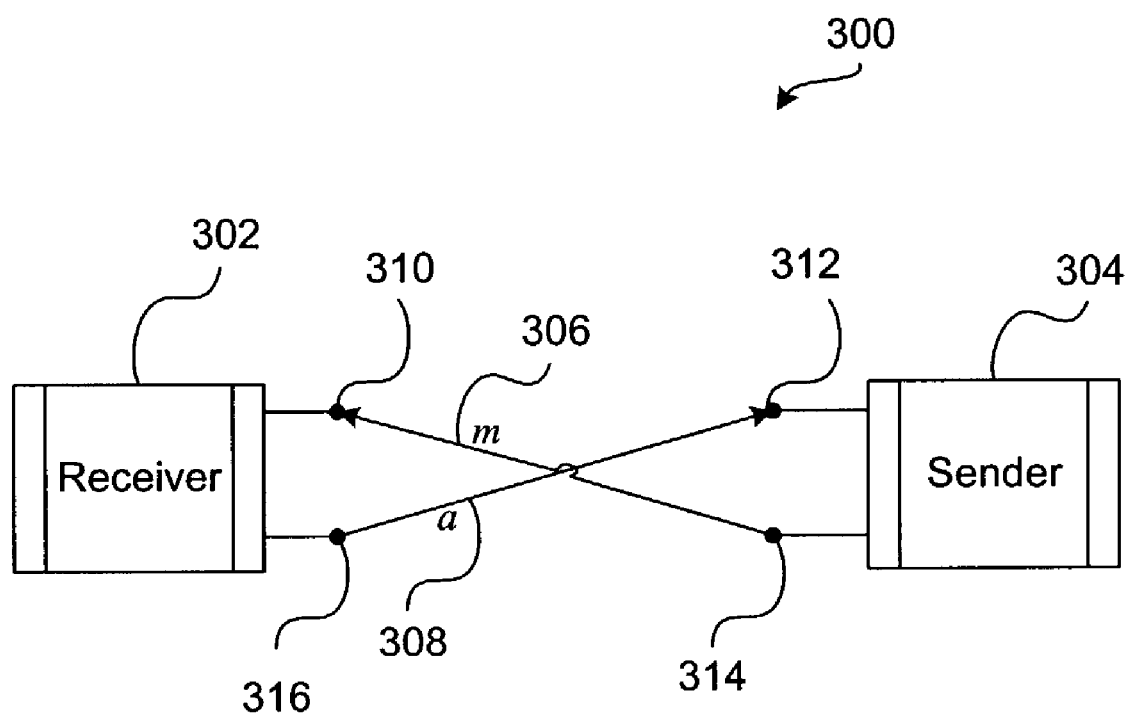
FIG. 3 is a functional diagram illustrating behavioral interaction between program modules in the message-passing computing environment of FIG. 1.

FIG. 3 shows a concurrent software system 300 wherein two program modules—a sender program module 304 and a receiver program module 302—communicate with one another as the program modules 304 and 302 are implemented in an asynchronous computing environment 100 in accordance with an embodiment of the present invention. Within the concurrent software system 300, the sender program module 304 sends messages to the receiver program module 302, and the receiver program module 302 receives messages from the sender program module 304, through a message channel (m) 306. Consequently, the receiver program module 302 sends messages to the sender program module 304, and the sender program module 304 receives messages from the receiver program module 302, through an acknowledgement channel (a) 308. The environment for the concurrent software system 300 is therefore defined as the message channel 306 and the acknowledgement channel 308. An input port 312 and an output port 314 provide physical connections that enable the sender program module 304 to access the acknowledgement channel 308 and the message channel 306, respectively. Likewise, an input port 310 and an output port 316 provide physical connections that enable the receiver program module 302 to access the message channel 306 and the acknowledgement channel 308, respectively.

Initially, the sender program module 304 sends a message on the message channel 306 to the receiver program module 302. After the sender program module 304 sends a message on the message channel 306, the sender program module 304 waits for a response from the receiver program module 302 on the acknowledgement channel 308. If the sender program module 304 waits for a message on the acknowledgement channel 308 prior to sending a message on the message channel 306, an error signal results due to the possibility of deadlock. Behavioral actions of the sender program module 304 during implementation may be modeled using the pi-calculus expression $S=\mu\alpha.(m!.a?.\alpha+a?.Error)$.

Initially, the receiver program module 302 waits for a message to be received on the message channel 306. As shown in the illustration of FIG. 3, this message is transmitted by the sender program module 304. After the receiver program module 302 receives the message through the message channel 306, the receiver program module 302 replies to the sender program module 304 by sending a response message on the acknowledgement channel 308. The period in time elapsed beginning as the receiver program module 302 receives the message sent by the sender program module 304 and when the receiver program module 302 sends a response message on the acknowledgement channel 308 is indefinite due to the asynchrony associated with concurrent program modules, as described above. This indefinite period of time does not itself cause deadlock errors. However, if the receiver program module 302 sends a message on the acknowledgement channel 308 prior to receiving a message on the message channel 306, an error signal results due to the possibility of deadlock. Behavioral actions of the receiver program module 302 during implementation may be declared using the pi-calculus expression $R=\mu\beta.(m?.(.a!.\beta+m?.Error)$.

The concurrent software system 300 illustrates actions performed or taken by the implementations of the sender program module 304 and the receiver program module 302 interacting with one another in an asynchronous computing environment 100. As noted above, the source code of a program module, such as 302 and 304, includes various type annotations, such as 126, that specify the intended message-passing actions for the program module 302 or 304 in accordance with an embodiment of the present invention. If the implemenatation of the program module 302 or 304 does not perform consistent to, or as specified by the type annotations contained therein, then an error occurs and either the source code or one of the type annotations should be corrected for conformance therebetween. If, however, the implementation conforms to the type annotations, a behavioral module reflecting type processes expressed by the type annotations is abstracted for the program module. If the behavioral module is a valid abstraction for the implementation, conclusions concerning various behavioral properties associated with the implementation of the program module may be determined by evaluating the behavioral module using a model checker in accordance with an embodiment of the present invention.

Figure 4:
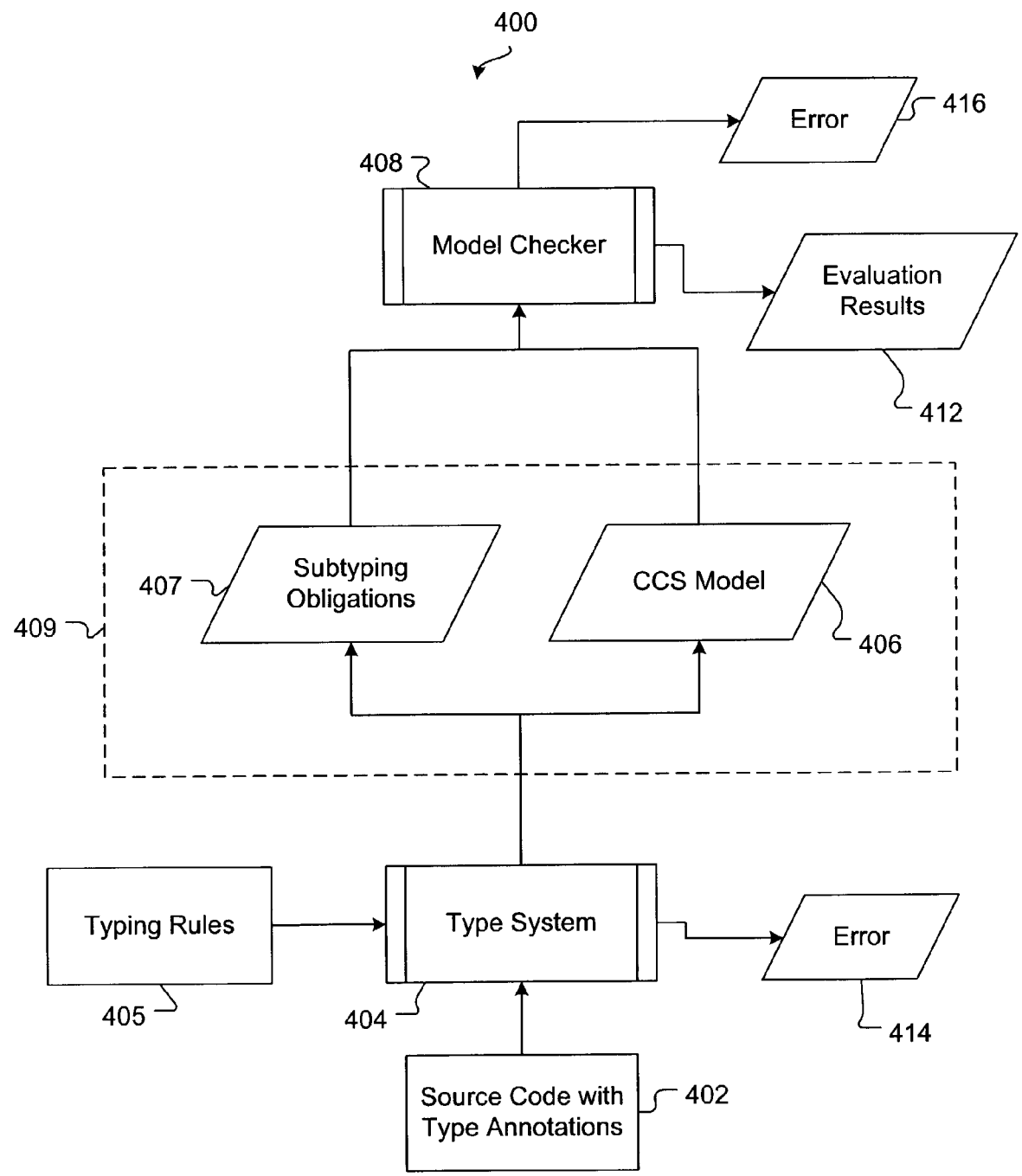
FIG. 4 is a behavioral analysis system having a type system and a model checker in accordance with an embodiment of the present invention.

A system 400 for checking whether the implementation conforms to the type annotations, abstracting a behavioral module for the program module, checking the behavioral module to determine whether the module is a valid abstraction of the implementation and, if found valid, evaluating the behavioral module to render a conclusion concerning the behavioral properties associated with the implementation of a program module is shown in FIG. 4 in accordance with an embodiment of the present invention. This system 400 is hereinafter referred to as a "behavioral analysis system." The process for checking whether the implementation conforms to the specified behavior of the type annotations is referred to as "type checking." The process for abstracting a behavioral module for the program module is referred to as "abstraction." The process for checking the behavioral module to determine whether the module is a valid abstraction of the implementation is referred to herein as "model checking." The process for evaluating the behavioral module to render a conclusion concerning the behavioral properties associated with the implementation of the program module is referred to herein as "evaluation." The type checking process, the abstraction process, the model checking process and the evaluation process performed in turn by the behavioral analysis system 400. Collectively, these processes are hereinafter referred to as a "behavioral analysis process."

For illustration purposes, the behavioral analysis system 400 shown in FIG. 4 is described as being utilized to analyze the sender program module 304 and the receiver program module 302 of the concurrent software system 300. As noted above, the sender program module 304 and the receiver program module 302 should not be limited to being program modules of two message-passing application programs residing in separate computing systems that interact with one another in a distributed computing environment. Indeed, the receiver program module 302 and the sender program module 304 may be program modules of the same application program, wherein the sender program module 304 is a program module on a first stage of the application program and the receiver program module 302 is a program module on a second stage of the application program.

The behavioral analysis system 400 analyzes the concurrent software system 300 in modular fashion in accordance with an embodiment of the present invention. That is, the behavioral analysis system 400 analyzes the sender program module 304 and the receiver program module 302 in turn in order to analyze the concurrent software system 300 as a whole. In contrast to analyzing the concurrent software system 300 as a whole, evaluating the concurrent software system 300 in program-by-program fashion alleviates state explosion since each program module 302 and 304 is being evaluated independently of the other. That is, since one program module 302 or 304 is evaluated using set assumptions of the other program module 302 or 304, such an evaluation does not result in state explosion.

The behavioral analysis system 400 includes a type system 404 and a model checker 408 in accordance with an embodiment of the present invention. The source code 402 for a program module, such as the sender program module 304 and the receiver program module 302, is input to the type system 404. As noted above, the source code 402 includes type annotations, such as 126, declared by the program module developer that specify intended message-passing behavior for the program module. The type annotations allow programmers to specify "type" processes defining the occurrence and sequence of message-passing actions that the developer intends the program module to perform or take. Whereas the source code, and thus the operations thereof, may be declared using a pi-calculus mathematical expression, the type annotations are declared as type processes in accordance with an embodiment of the present invention. Furthermore, a type annotation may be specified for each operation, such as 114 or 116, contained in the source code.

The type system 404 performs both the type checking process and the abstraction process for the behavioral analysis system 400 in accordance with an embodiment of the present invention. Typing rules 405 are input to the type system 404 for use in the type checking process. The typing rules 405 thus define the process that the type system 404 uses to determine whether the implementation of the program module conforms to the type annotations contained in the source code 402.

The type checking process is performed in modular fashion in that the typing rules 405 are applied to each operation of the source code in turn. The type system 404 applies the typing rules in turn to each operation to determine whether the operation conforms to a type annotation associated with the operation. Due to the concurrent nature of operations in a program module, assume-guarantee reasoning is applied to the type checking process. The assume-guarantee reasoning is thus applied in modular fashion to each operation. The assume-guarantee principle assumes that a second operation communicating with a first operation during implementation conforms to a type annotation to which the second operation is associated while the first operation is checked for conformance with a type annotation to which the first operation is associated. As such, the type system 404 applies circular assumptions to each operation of an implementation that enable the type system 404 to check conformance with a specified annotation without exploding the state space of the operations. If the type system 404 determines that an operation of the implemenation does not conform to the associated type annotation, the type system 404 outputs an error message 414 indicative of the fact that either the operation, and thus the program module, is not well-typed, i.e., invalid or improper type annotation, or not well-implemented, i.e., incorrect source code declaration. If the type system 404 determines that all operations of the implementation do conform to the type annotations, the type system 404 proceeds to the abstraction process.

Using the abstraction process, the type system 404 abstracts a behavioral module 409 for the program module. The behavioral module 409 includes a behavioral model 406 and subtyping obligations 407 for the program module. The behavioral model 406 is expressed as a calculus communicating system (CCS) process in accordance with an embodiment of the present invention. Thus, the behavioral model 406 referred to as a CCS model, is a complete model of the message-passing actions specified by each of the type annotations for the program module. The typing rules are used to guide abstraction of the CCS model 406 by the type system 404 and discard specified actions that cannot be performed within an environment defined by the type annotations. The type system 404 extracts the type processes specified by each type annotation to construct the CCS model 406 such that the model 406 is effectively a collection of each type process specified by all type annotations of the program module. More specifically, the type system 404 performs the abstraction process in modular fashion by constructing the CCS model 406 as the typing rules are applied one type annotation at a time. Using the typing rules, the type system 404 discards those actions included in the type processes that are not performed on the restricted set of channels specified by the current type annotation. As such, the type system 404 constructs the CCS model 406 to be a simplistic model of all type processes intended to be performed by the implementation of the program module in an environment restricted to the specified communication channels, as specified by the type annotations.

Referring to the illustration for the concurrent software system 300 of FIG. 3, the implementation of the sender program module 304 is abstracted as the CCS model S(abstraction)=$\mu\alpha.(m!.a?.\alpha)$, which is limited to an action of initially sending a message on the message channel 306 and thereafter an action of continuously waiting for a response message on the acknowledgement channel 308. Because the type system 404 has determined that the program module is well-typed and well-implemented, the type system 404 discards the action of the sender program stating an error occurs in if the implementation waits for a message on the acknowledgement channel 308 prior to sending a message on the message channel 306. Indeed, this action has been proven not to occur by the type system 404. Similarly, the implementation of the receiver program module 302 is abstracted as the CCS model R(abstraction)=$\mu\beta.(m?.a!.\beta)$, which is limited to an action of initially waiting for a message on the message channel 306 and thereafter an action of sending a response message on the acknowledgement channel 308. The system 300, as a whole, may be abstracted as well, and would be a combination of the message-passing actions of the abstractions for the receiver program module 302 and the sender program module 304.

The type system 404 also abstracts subtyping obligations 407 as part of the behavioral module 409 for the program module. The subtyping obligations 407 are relational assumptions concerning the consistency and interrelationship between type processes specified by the type annotations of the program module. The subtyping obligations 407 assume that the type processes of the program module satisfy conditions of open simulation—that each type process of the program module simulates at least one other type process.

The assumptions asserted by the subtyping obligations 407 are checked by a model checker 408. Model checkers are well known in the art, and therefore not described in detail herein. The model checker 408 analyzes the subtyping obligations 407 to determine whether the CCS model 406 is a valid abstraction for the implementation of the program module. That is, if each type process of the program module simulates at least one other type process of the program module, the model checker 408 designates the CCS model 406 as a proper abstraction for the implementation. In rendering a determination on whether the CCS model 406 is a valid abstraction for the implementation, the model checker 408 applies principles of assume-guarantee reasoning to the assumptions expressed by the subtyping obligations 407 in accordance with an embodiment of the present invention. For example, while analyzing whether a first type process simulates a second type process, the model checker 408 assumes that the second type process simulates at least one other type process. As such, the type system model checker 408 applies circular assumptions to the subtyping obligations 407 to check satisfaction of open simulation reasoning between type processes of the program module without exploding the state space of the processes.

If the model checker 408 concludes that each of the subtyping obligations are not satisfied, the model checker 408 outputs an error message 416 indicative of the fact that the CCS model 406 is not a valid abstraction of the implementation of the program module. If however, the model checker 408 concludes that each of the subtyping obligations are satisfied, then the CCS model 408 is deemed a valid abstraction for the implementation. If deemed a valid abstraction of the implementation, the CCS model 406 is input to the model checker 408 for the evaluation process. During the evaluation process, the model checker 408 may check any behavioral property of the CCS model 406, and based on the conclusion rendered for the CCS model 406, can make the same conclusion about that behavioral property of the implementation of the program module because the CCS model 406 is a valid abstraction of the implementation. For instance, if the CCS model 406 does not deadlock, then the implementation of the program module will not deadlock. Conversely, if the CCS model 406 deadlocks, the implementation of the program module may or may not deadlock. The model checker 408 renders evaluation results 412 indicative of the conclusion made about the behavioral property evaluation.

Figure 5:
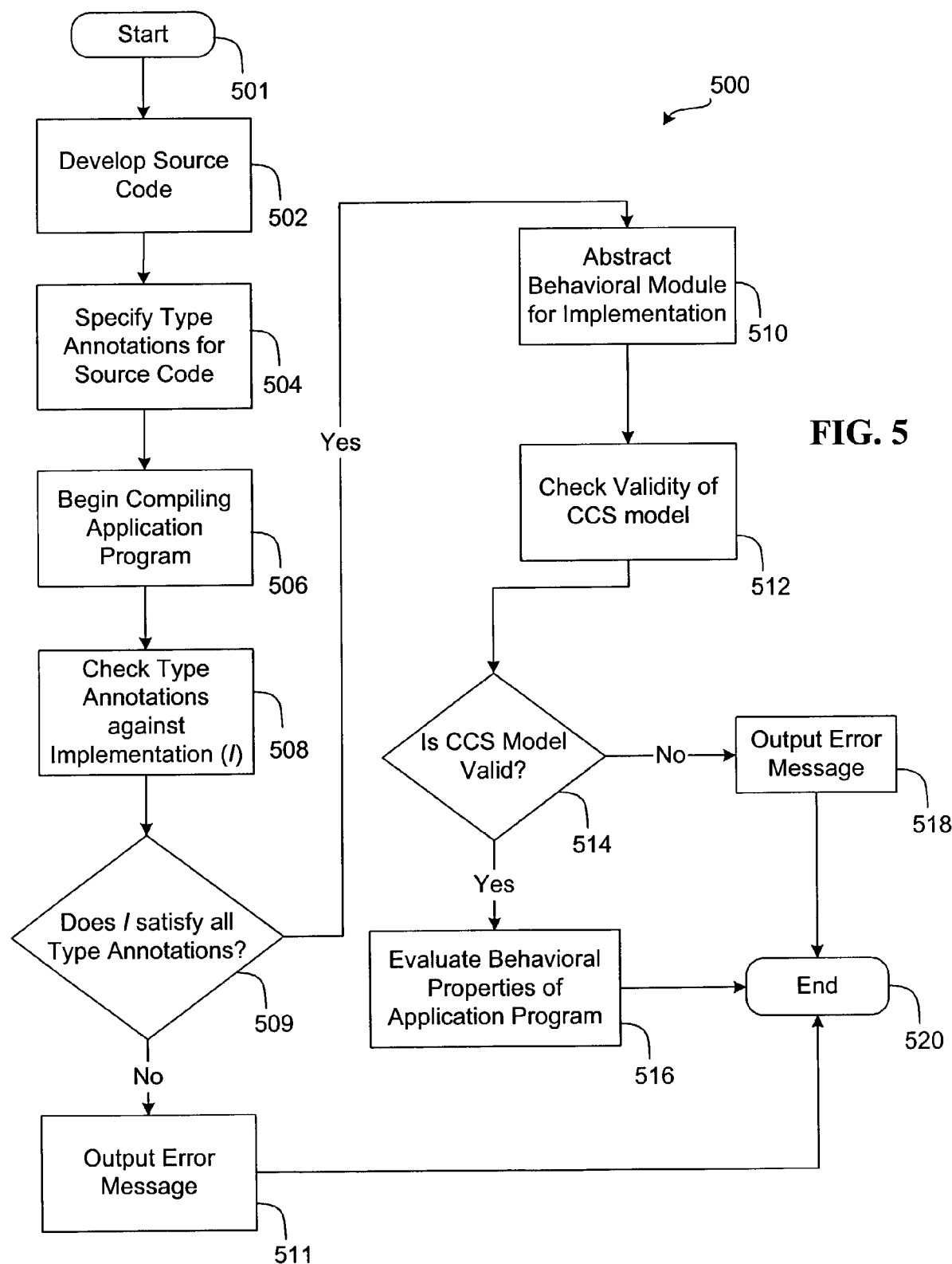
FIG. 5 is a flow diagram that illustrates operational characteristics for developing a message-passing application program in accordance with an embodiment of the present invention.

A flow diagram illustrating operational characteristics of a process 500 for developing (hereinafter, "development process") a message-passing application program is shown in FIG. 5 in accordance with an embodiment of the present invention. The development process 500, which may be a manual or computer-implemented process, or a combination thereof, is performed using an operation flow beginning at a start operation 501 and concluding at a terminate operation 520. From the start operation 501, the operation flow passes to a develop operation 502.

The develop operation 502 develops the source code for the message-passing application program. As noted above, the source code may be expressed as a pi-calculus mathematical expression containing various operations. The operations provide communication and synchronization mechanisms to connect the message-passing application program to other program modules during communication sessions. As source code for the message-passing application program is implemented, i.e., invoked, compiled or otherwise executed, an implementation for the source code is created that reflects the message-passing actions actually taken or performed by the message-passing application program. From the develop operation 502, the operation flow passes to a specify operation 504.

The specify operation 504 declares type annotations, also referred to as behavioral type signatures, for the message-passing application program. As noted above, the type annotations specify intended message-passing actions for the message-passing application program during implementation. In accordance with an embodiment, the type annotations are expressed as calculus communicating system (CCS) processes, i.e., "type" processes, and placed by the application developer within the source code such that a type annotation is associated with each operation. The type annotations are communication protocols that represent the input and/or output actions that the program module developer expects each operation to perform or take on a restricted set of communication channels. As such, the type annotations specify the intended message-passing actions to be performed or taken by each operation of the message-passing application program during implementation. From the specify operation 504, the operation flow passes to an initiate compile operation 506. The initiate compile operation 506 begins compiling the message-passing application program thereby creating the implementation for the application program. Following the initiate compile operation 506, the operation flow passes to a type checking operation 508.

The type checking operation 508 determines whether the implementation conforms to the behavior specified by the type annotations. The type checking operation 508 applies typing rules to the implementation to determine whether the implementation satisfies each type annotation specified for the message-passing application program. The type checking operation 508 and the modular manner in which the operation 508 is applied to the implementation are described in more detail below in FIG. 6 in accordance with an embodiment of the present invention. From the type checking operation 508, the operation flow passes to a first query operation 509. The first query operation 509 examines the determination by the type checking operation 508 on whether the implementation conforms to the specified behavior of the type annotations and branches the operation flow accordingly. If the implemenation does not conform to all type annotations of the message-passing application program, the first query operation 509 branches the operation flow to a first output operation 511. The first output operation 511 outputs an error message indicative of the fact that the message-passing application program is not well typed, i.e., invalid or improper type annotation, or not well implemented, i.e., incorrect source code declaration. From the output operation 511, the operation flow concludes at the terminate operation 520. If, however, the implementation conforms to all type annotations of the message-passing application program, the first query operation 509 branches the operation flow to an abstraction operation 510.

The abstraction operation 510 abstracts subtyping rules and the behavioral model for the behavioral module of the message-passing application program. The behavioral model is expressed as a calculus communicating system (CCS) in accordance with an embodiment, and thus referred to herein as a CCS model. The CCS model is a complete model of the message-passing actions specified by each of the type annotations for the message-passing application program. More specifically, the CCS model is constructed as the abstraction operation 510 extracts the type processes specified by each type annotation such that the CCS model is effectively a collection of each type process of the message-passing application program. The subtyping obligations, which are later used by a model checking operation 512 to check the validity of the CCS model, are relational assumptions concerning the consistency and interrelationship between type processes of the message-passing application program. The subtyping obligations set forth the assumption that the type processes satisfy conditions of open simulation with one another. Thus, the subtyping obligations assume that each type process simulates at least one other type process of the message-passing application program. The abstraction operation 510 and the modular performance of the abstraction operation 510 are described in more detail below in FIG. 7 in accordance with an embodiment of the present invention. From the abstraction operation 510, the operation flow passes to a model checking operation 512.

The model checking operation 512 analyzes the subtyping obligations to determine whether the CCS model is a valid abstraction for the implementation of the message-passing application program. In rendering a determination on whether the CCS model is a valid abstraction for the implementation, the model checker applies principles of assume-guarantee reasoning to the assumptions expressed by the subtyping obligations in accordance with an embodiment of the present invention. For example, while analyzing whether a first type process simulates a second type process, the model checking operation 512 assumes that the second type process simulates at least one other type process of the message-passing application program. The model checking operation 512 and the modular manner in which the operation 512 is performed are described in more detail below in FIG. 8 in accordance with an embodiment of the present invention. After each subtyping obligation has been analyzed, the operation flow passes to a second query operation 514.

The second query operation 514 examines the determination by the model checking operation 512 on whether the CCS model is a valid abstraction of the implementation and branches the operation flow accordingly. If the CCS model is not a valid abstraction of the implementation, the second query operation 514 branches the operation flow to a second output operation 518. The second output operation 518 outputs an error message indicative of the fact that the CCS model is not a valid abstraction of the implementation. From the second output operation 518, the operation flow concludes at the terminate operation 520. If, however, the CCS model is a valid abstraction of the implementation, the second query operation 514 branches the operation flow to an evaluation operation 516. The evaluation operation 516 evaluates one or more behavioral properties of the CCS model. Based on the conclusion rendered for the CCS model, the evaluation operation 516 renders the same conclusion about the one or more behavioral properties for the message-passing application program during implementation. Such a conclusion may be rendered because the CCS model is a valid abstraction of the implementation. The evaluation operation 516 and the modular manner in which the operation 516 is performed are described in more detail below in FIG. 9 in accordance with an embodiment of the present invention. From the evaluation operation 516, the operation flow concludes at the terminate operation 520.

Figure 6:
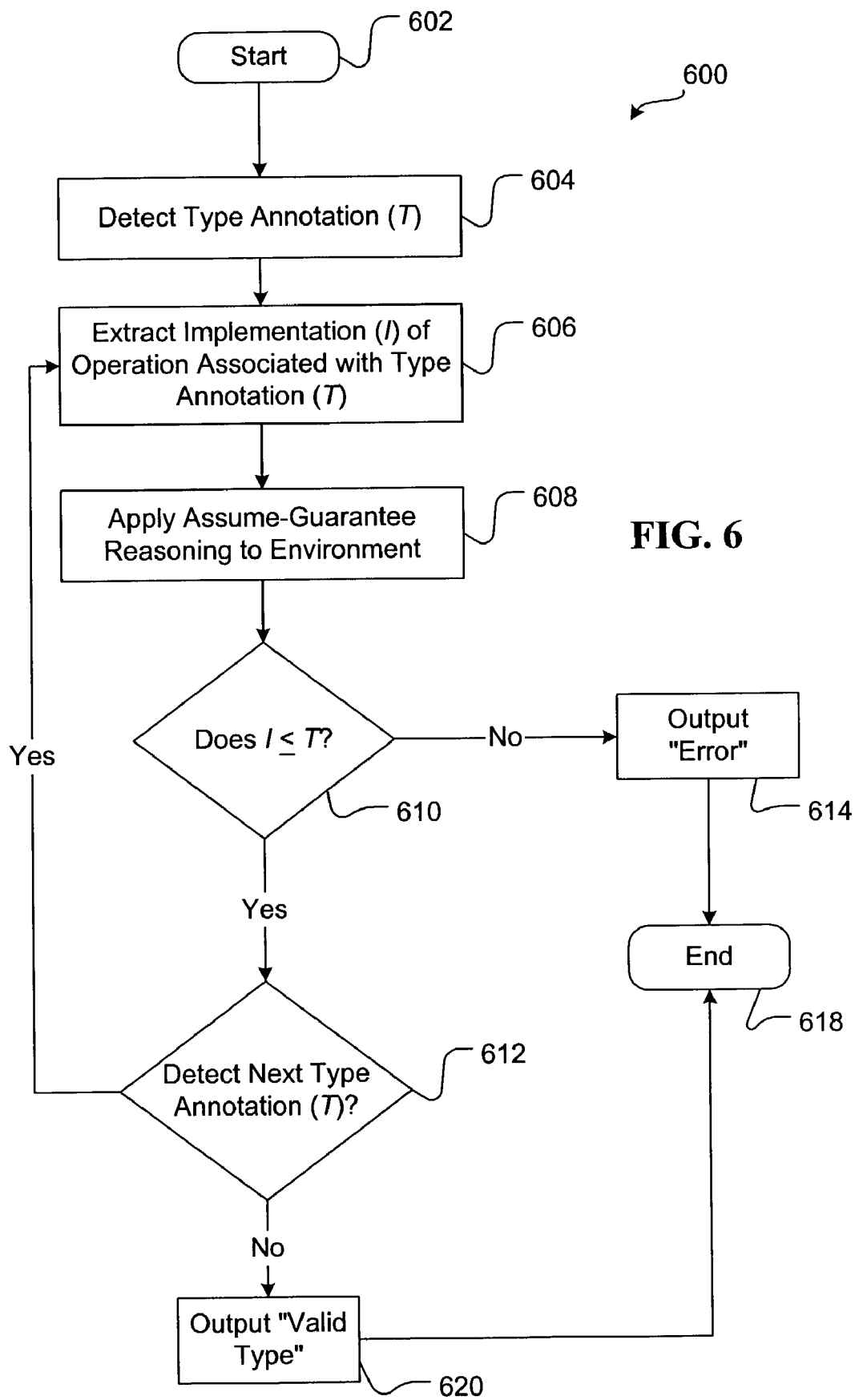
FIG. 6 is flow diagram that illustrates operational characteristics for checking whether an implementation for the message-passing application program of FIG. 5 conforms to behavior specified by type annotations.

Referring now to FIG. 6, a flow diagram of a type checking process 600 for the message-passing program being developed using the development process 500 is shown in accordance with an embodiment of the present invention. With respect to the development process 500, the type checking process 600 involves the type checking operation 508, the first query operation 509 and the first output operation 511. The type checking process 600 is performed using an operation flow beginning at a start operation 602 and concluding at a terminate operation 618. The start operation 602 begins during compilation of the message-passing application program and thus operates on the implementation. From the start operation 602, the operation flow passes to a detect operation 504. The detect operation 504 examines the source code of the message-passing application program to detect a type annotation declared therein. As noted above, type annotations may be declared at each operation declaration in the message-passing application program. Once a type annotation is detected, the operation flow passes to the extract operation 606.

The extract operation 606 extracts the implementation for the operation associated with the detected type annotation. The implementation reflects the actual message-passing actions performed or taken by the operation during compilation as well as the channels over which the message-passing actions are transmitted to or from the operation. From the extract operation 606, the operation flow passes to an application operation 608. The application operation 608 applies assume-guarantee reasoning to an environment for the operation. The environment is defined as the restricted set of channels through which the operation communicates with other operations during implementation. For example, if the operation communicates with another operation using a message channel (m) and an acknowledgement (a) channel, the environment (E) is represented by the pi-calculus expression "E:=m,a." From the application operation 608, the operation flow passes to a check conformance operation 610.

The check conformance operation 610 determines whether the implementation for the operation conforms to the detected type annotation based on certain typing rules. In accordance with an embodiment, the typing rules state that conformance is defined as simulation ($\leq$) in an environment following the applied assume-guarantee reasoning. Simulation is simply defined in conjunction with conformance if the implementation satisfies each action specified by the associated type annotation. As noted above, the type annotation specifies a type process of certain actions that the operation is to perform or take during implementation. For example, the type annotation may specify that the operation initially sends a message on the message channel (m). After the message is sent on the message channel (m), the type annotation may specify that the operation is to wait for a response message on the acknowledgement channel (a). Thus, the implementation conforms to the type annotation if the operation actually sends a message on the message channel (m) and thereafter waits for a response message on the acknowledgement channel (a) during implementation.

The check conformance operation 610 uses principles of assume-guarantee reasoning in assuming that another operation will receive the message sent on the message channel (m) and thereafter reply to the received message by transmitting a response message to subject operation on the acknowledgement channel (a). As such, by applying assume-guarantee reasoning in this manner, the check conformance operation 610 can check conformance of the subject operation with the detected type annotation without the introduction of state space explosion resulting from asynchrony and nondeterminism in such asynchronous communications. Indeed, the check conformance operation 610 only analyzes those actions taken by the operation being implemented because it assumes that all other operations conform to a type annotation to which the other operations are associated.

If the check conformance operation 610 determines that the implementation does not conform to the detected type annotation, the operation flow passes to a first output operation 614. The first output operation 614 outputs an error message indicative of the fact that the message-passing application program is not well typed, i.e., invalid or improper type annotation, or not well implemented, i.e., incorrect source code declaration. In accordance with a more specific embodiment, the first output operation 614 may identify in the error message the operation-type annotation pair wherein conformance is not satisfied such that the program developer may readily correct the error. From the first output operation 614, the operation flow concludes at the terminate operation 618.

If the check conformance operation 610 determines that the implementation for the operation conforms to the detected type annotation, the operation flow passes to the next detect operation 612. The next detect operation 612 examines the source code to detect whether any other type annotations other than the one already detected is declared therein. If another type annotation is detected, the operation flow passes to the extract operation 606 and continues as previously described. The operation flow thus continues in a loop until all type annotations for the message-passing application program are detected. As such, the type checking process 600 is a modular process wherein operations of the message-passing application program are evaluated in operation-by-operation fashion against a type annotation to which each operation is associated. Once the next detect operation 612 determines that all type annotations have been detected in the source code, the operation flow passes to the second output operation 620. If the operation flow reaches the second output operation 620, the implementation of each operation of the message-passing application program conforms to a type annotation to which the operation is associated. Thus, the second output operation 620 outputs a message indicative of the fact that the message-passing application program, as a whole, is both well-typed and well-implemented. From the second output operation 620, the operation flow concludes at the terminate operation 618.

Figure 7:
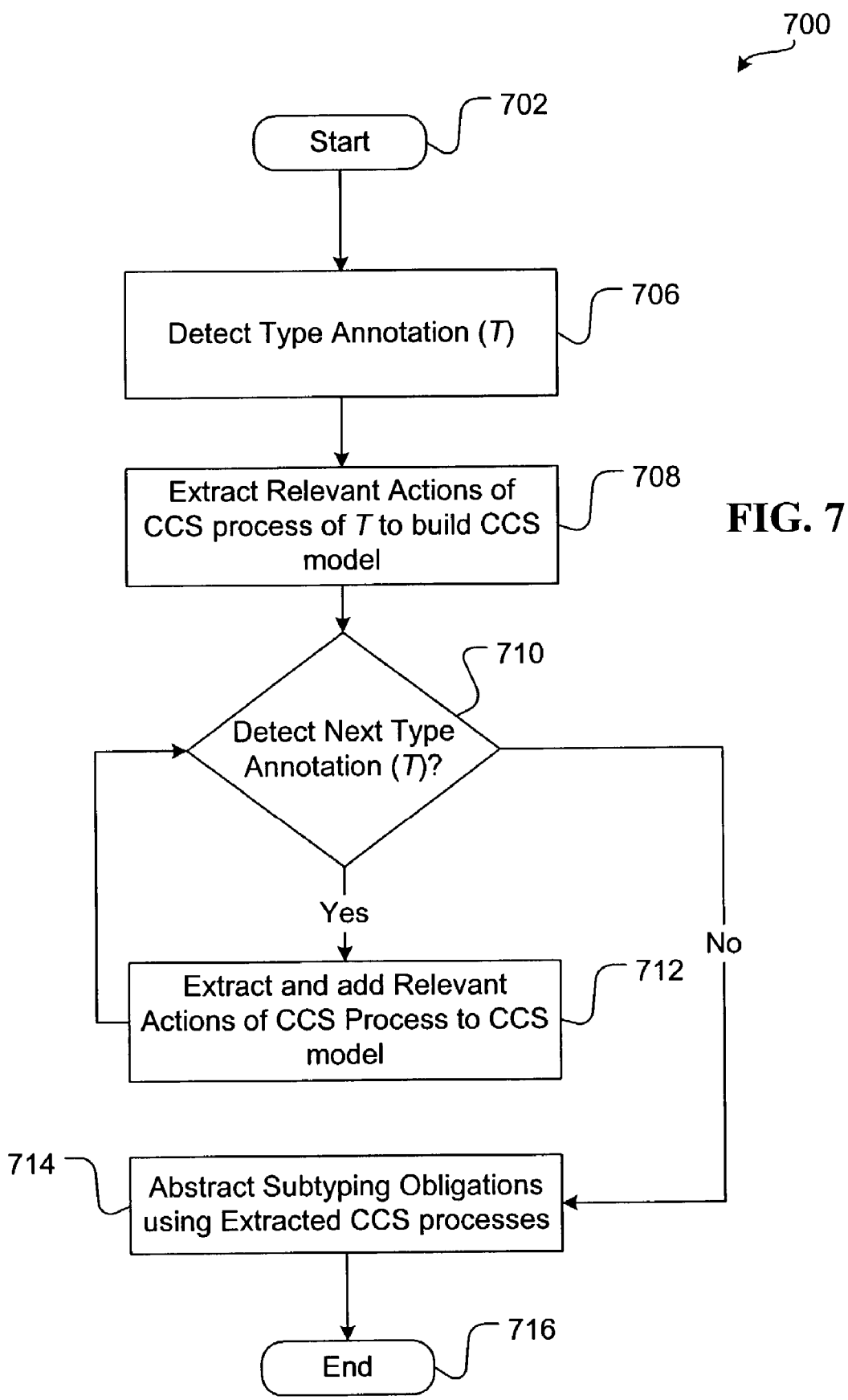
FIG. 7 is a flow diagram that illustrates operational characteristics for abstracting a behavioral model and sub-typing obligations of a behavioral module for the message-passing application program of FIG. 6.

Referring now to FIG. 7, a flow diagram of an abstraction process 700 for the message-passing program being developed using the development process 500 is shown in accordance with an embodiment of the present invention. Thus, the abstraction process 700 is a more detailed description of an embodiment of operations of the abstraction operation 510, and thus is only performed if the message-passing application program, as a whole, is both well-typed and well-implemented as determined by the type checking process 600 shown in FIG. 6. The abstraction process 700 is performed using an operation flow beginning at a start operation 702 and concluding at a terminate operation 716. The start operation 702 begins following the "yes" branch from the first query operation 509. From the start operation 702, the operation flow passes to a detect operation 706.

The detect operation 706 examines the source code of the message-passing application program to detect a type annotation declared therein. From the detect operation 706, the operation flow passes to an extract operation 708. As noted above, the type annotation specifies an intended type process for a specific operation of the message-passing application program. The type process specifies message-passing behavior for the operation as well as channels for transmission of the actions. The extract operation 708 extracts message-passing actions relevant to the environment of the operation to which the detected type annotation is associated and begins building a type model of all relevant message-passing actions specified as type processes for the message-passing application program. The environment is defined as the restricted set of channels through which the operation communicates with other operations during implementation. For example, if the operation communicates with another operation using a message channel (m) and an acknowledgement (a) channel, the environment (E) is represented by the pi-calculus expression E:=m,a. Thus, the extract operation 708 extracts only the message-passing actions that are specified by the type process as being performed or taken on either the message channel (m) or the acknowledgement channel (a). After the relevant message-passing actions are extracted, the operation flow passes to a next detect operation 710.

The next detect operation 710 examines the source code to detect whether any other type annotations other than the one already detected is declared therein. If another type annotation is detected in the source code, the operation flow passes to a next extract operation 712. The next extract operation 712 extracts message-passing actions relevant to the environment of the operation to which the detected type annotation is associated and adds the relevant actions to the CCS model. Following the next extract operation 712, the operation flow passes back to the next detect operation 710 and continues as previously described. The operation flow thus continues in a loop until all type annotations for the message-passing application program are detected, and thus relevant actions of type processes extracted therefrom. As such, the abstraction process 700 is a modular process wherein type processes are extracted and the CCS model is built process by process. Once the next detect operation 712 determines that all type annotations have been detected in the implementation, the operation flow passes to an abstract obligations operation 714.

The abstract obligations operation 714 uses the type processes specified by the detected type annotations to abstract subtyping obligations therefrom. The subtyping obligations are relational assumptions concerning the consistency and interrelationship between type processes of the message-passing application program. The subtyping obligations assume that the type processes of the message-passing application program satisfy conditions of open simulation. Thus, the subtyping obligations assume that each type process of the message-passing application program simulates at least one other CCS process message-passing application program. As described in more detail in FIG. 8, the assumptions asserted by the subtyping obligations are checked by a model checker to ascertain the validity of the CCS model in accordance with an embodiment of the present invention. Thus, from the abstract obligations operation 714, the operation flow concludes at the terminate operation 716 such that a model checking process may be initiated.

Figure 8:
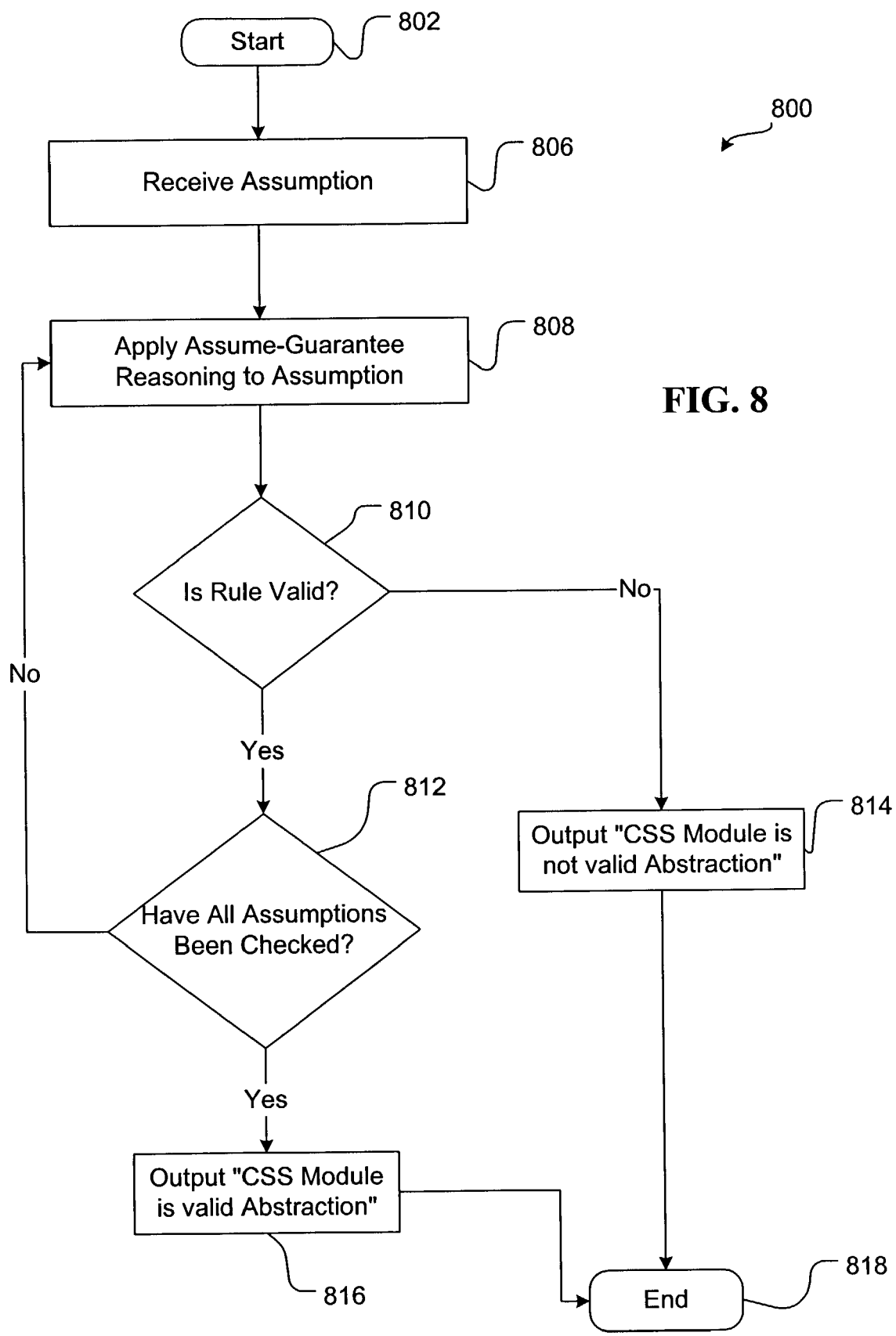
FIG. 8 is a flow diagram that illustrates operational characteristics for evaluating whether the behavioral model of FIG. 7 is a valid abstraction of the implementation.

Referring now to FIG. 8, a flow diagram for a model checking process 800 for the message-passing application program being developed using the development process 500 is shown in accordance with an embodiment of the present invention. Thus, the model checking process 800 is a more detailed description of an embodiment of operations of the model checking operation 512, the second query operation 514 and the output operation 518. Like the abstraction process 700, the model checking process 800 is only performed if the message-passing application program, as a whole, is both well-typed and well-implemented, as determined by the type checking process 600 shown in FIG. 6. The model checking process 800 is performed using a model checker in accordance with an embodiment of the present invention. Because model checkers are well known in the art, and many different forms, types and brands of model checkers may perform the model checking process 800 described below, details of such model checkers are not described in detail herein. The model checking process 800 is performed using an operation flow beginning at a start operation 802 and concluding at a terminate operation 818. The start operation 802 begins following the abstraction operation 510. From the start operation 802, the operation flow passes to a receive operation 806.

The receive operation 806 receives an assumption of the subtyping obligations abstracted by the abstraction process 700. In accordance with an embodiment, each assumption states that a type process specified by a type annotation in the message-passing program simulates another type process specified therein. After the assumption is received, the operation flow passes to an application operation 808. The application operation 808 applies assume-guarantee reasoning to the assumption. The principles of assume-guarantee reasoning used by the model checking process 800 are based on name restriction and non-blocking assumptions. Name restriction delimits the scope of a particular communication channel. Thus, name restriction gives information about which processes can be involved in communication over the channel. The importance of name restriction to assume-guarantee reasoning is that the assume-guarantee reasoning principles may take advantage of assumptions about the environment when checking the CCS model for validity as an abstraction of the implementation. In the absence of name restriction, the most general assumptions would be applied in that the environment could include any process. Name restriction limits the application of the assume-guarantee reasoning principles to a specific set of processes can take part in communicating with the CCS model that is currently being checked via the model checker. In accordance with an embodiment, non-blocking assumptions may also be used to establish principles of assume-guarantee reasoning applied by the model checking process 800 in checking whether the CCS model is a valid abstraction of the implementation.

Following the application operation 808, the operation flow passes to a first query operation 810. The first query operation 810 checks the assumption to determine if, indeed, a first type process specified by a first type annotation simulates a second type process specified by a second type annotation. While analyzing whether the first type process simulates the second type process, the first query operation 810 assumes that the second type process simulates at least one other type process of the message-passing application program. If the first query operation 810 concludes that the subtyping rule is not satisfied because the first type process does not simulate the second type process, the operation flow passes to a first output operation 814. The first output operation 814 outputs an error message indicative of the fact that the CCS model 406 is not a valid abstraction of the implementation message-passing application program. From the first output operation 814, the operation flow concludes at the terminate operation 818.

If, however, the first query operation 810 concludes that the assumption is satisfied because the first type process simulates the second type process, the operation flow passes to a second query operation 812. The second query operation 812 determines whether all assumptions of the subtyping obligations have been checked for satisfaction. If the second query operation determines that all assumptions have not been checked, the operation flow passes back to the application operation 808 and continues as principles of assume-guarantee reasoning are applied to the next assumption and a type process of the rule is checked for simulation with another type process as described above. The operation flow thus continues in a continuous loop until all assumptions of the subtyping obligations are checked. As such, the model checking process 800 is a modular process wherein subtyping obligations are evaluated in rule-by-rule fashion in order to render a conclusion on whether the CCS model, as a whole, is a valid abstraction of the implementation for the message-passing application program.

Once the next detect operation 812 determines that all assumptions of the subtyping obligations have been checked, the operation flow passes to the second output operation 816. If the operation flow reaches the second output operation 816, all assumptions of the subtyping obligations satisfy principles of open simulation, and thus, the CCS model is proven to be a valid abstraction for the implementation of the message-passing application program. Thus, the second output operation 816 outputs a message indicative of the fact that the CCS model is a valid abstraction. From the second output operation 816, the operation flow concludes at the terminate operation 818.

Figure 9:
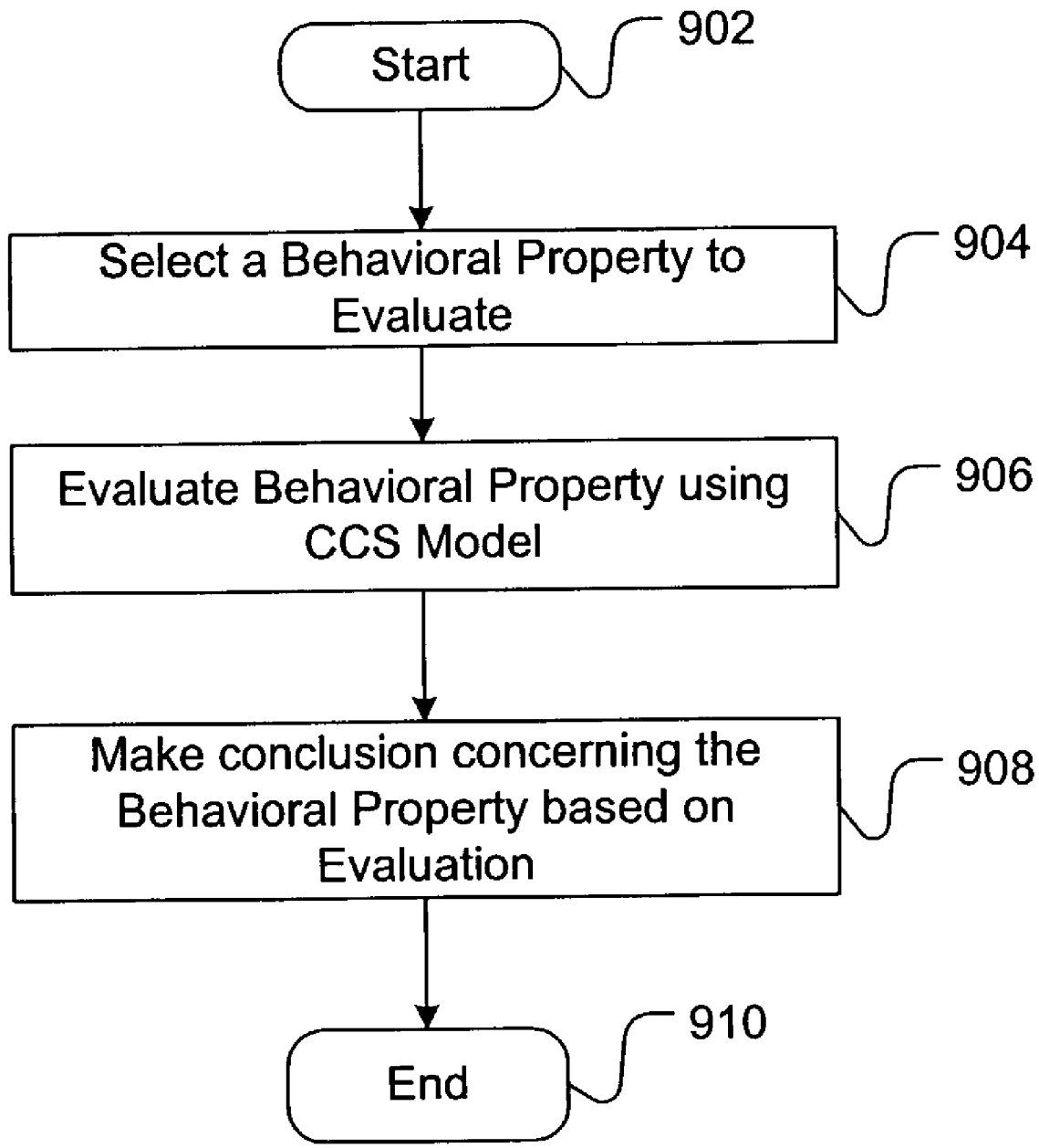
FIG. 9 is a flow diagram that illustrates operational characteristics for evaluating the behavioral model of FIG. 8 to render a conclusion concerning behavioral properties associated with the implementation of the message-passing application program.

If the CCS model is deemed a valid abstraction for the implementation by the model checking process 800, behavioral properties of the CCS model may be evaluated to render a conclusion on the behavioral properties of the implementation. Such an evaluation process is briefly described with reference to FIG. 9 in accordance with an embodiment of the present invention. FIG. 9 shows operations of a behavioral evaluation process 900 for the message-passing application program being developed by the development process 500. Thus, the behavioral evaluation process 900 is a more detailed description of an embodiment of operations of the evaluation operation 516. The behavioral evaluation process 900 may only be performed if the message-passing application program, as a whole, is both well-typed and well-implemented as determined by the type checking process 600 and if the CCS model constructed by the abstraction process 700 is deemed a valid abstraction by the model checking process 800. Like the model checking process 800, the behavioral evaluation process 900 is performed using a model checker in accordance with an embodiment of the present invention.

The behavioral evaluation process 900 is performed using an operation flow beginning at a start operation 902 and ending at a termination operation 910. The start operation 902 begins following the second query operation 514. From the start operation 902, the operation flow passes to a select operation 904. The select operation 904 selects a behavioral property of the message-passing application program that is to be evaluated using the behavioral evaluation process 900. For instance, the behavioral property selected may be deadlock freedom depicting whether the message-passing application program will deadlock during implementation. From the select operation 904, the operation flow passes to an analysis operation 906. The analysis operation 906 analyzes the valid CCS model to render a conclusion concerning the selected behavioral property. Back to the above-noted example, the analysis operation 906 would analyze the CCS model for deadlock errors during implementation.

After the analysis operation 906 has completed analyzing the CCS model, the operation flow passes to a rendering operation 908. The rendering operation 908 renders a conclusion concerning the selected behavioral property of the implementation for the message-passing application program which is the same conclusion rendered for the CCS model. The rendering operation 908 can make the same conclusion about that behavioral property of the implementation because the CCS model has been deemed a valid abstraction of the implementation. Thus, if the CCS model does not deadlock, then the implementation of the message-passing application program will not deadlock either. The behavioral property of deadlock freedom is used to describe the behavioral evaluation process of FIG. 9 as an illustration only; therefore it should be appreciated that behavioral properties other than deadlock freedom may be evaluated in similar fashion. Following the rendering operation 908, the operation flow concludes at the terminate operation 910.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims. For example, although type annotations are described herein as type processes, a type annotation may be expressed using any form of mathematical expression or programming language. Likewise, the source code for the program modules is described herein as expressed using pi-calculus mathematical expressions, but may be expressed using any form of mathematical expression or programming language.

The invention claimed is:

1. A system for modeling behavior of a message-passing program module wherein the message-passing program module communicates with other program modules and wherein intended message-passing behavior of the message-passing program module is specified by a type annotation, the system comprising:
   a memory for storing:
      typing rules defining a conformance relationship between the message-passing program module and the type annotation; and
      a type system; and
   a computer processor that executes instructions that:
      direct the type system to apply the typing rules to render a conclusion on whether actions of the message-passing program module satisfy the intended behavior expressed by the type annotation, wherein if the actions of the message-passing program module do not satisfy the intended behavior expressed by the type annotation, the type system output an error message indicating that the message-passing application program is not well-implemented, and if the actions of the message-passing program module do satisfy the intended behavior expressed by the type annotation, the type system outputs a valid message indicating that the message-passing application program is well-implemented.

2. A system as defined in claim 1, wherein the conformance relation is open simulation.

3. A system as defined in claim 1, wherein the type annotation specifies a process of intended input and output actions that the message-passing program module is to perform on a set of communication channels.

4. A system as defined in claim 3, wherein the type system extracts an implementation model of the message-passing program module, wherein the implementation model includes actual input and output actions performed by the message-passing program as the message-passing program is compiled.

5. A system as defined in claim 4, wherein the type system applies the typing rules to the implementation to determine whether the conformance relationship exists between the message-passing program module and the type annotation.

6. A system as defined in claim 3, wherein the type system comprises an abstraction module abstracting a behavioral module reflecting the intended input and output actions specified by the process, the system further comprising:
   a model checker applying an assume-guarantee principle to the behavioral module to conclude whether the behavioral module is a valid abstraction of the implementation model.

7. A system as defined in claim 6, wherein the model checker evaluates behavioral properties of the behavioral module and renders a conclusion on the behavioral properties for the message-passing program module if the behavioral module is a valid abstraction of the implementation model.

8. A computer implemented method for modeling behavior of a message-passing program module having operations responsible for establishing communications between the message-passing program module and other program modules, the method comprising:
   specifying a first type process reflecting intended message-passing behavior of an operation of the message-passing program module, wherein the first type process is expressed as a type annotation;
   compiling the message-passing program module to render an implementation for the operation;
   defining a conformance relation for checking conformance between the implementation and the type annotation;
   checking the implementation against the first type process to determine whether the implementation satisfies the conformance relation with respect to the type annotation;
   if the implementation does not satisfy the conformance relation, displaying an error message indicating that the message-passing application program is not well-implemented; and
   if the implementation does satisfy the conformance relation, displaying a valid message indicating that the message-passing application program is well-implemented.

9. A method as defined in claim 8, wherein the checking act comprises:
   assuming that an implementation of a second operation of the message-passing program module satisfies the conformance relation with respect to an associated type annotation.

10. A method as defined in claim 9, wherein the conformance relation is open simulation.

11. A method as defined in claim 8, wherein the specifying act comprises:
   defining a set of communication channels for performance of the first type process.

12. A method as defined in claim 11, further comprising:
   if the implementation satisfies the conformance relation, abstracting a behavioral model reflecting message-passing actions required by the first type process.

13. A method as defined in claim 12, wherein the abstracting act comprises:
   discarding information contained in the first type process that does not relate to an action performed on a channel of the set of communication channels for the first type process.

14. The method of claim 12, further comprising:
   abstracting subtyping obligations defining a relational assumption between the first type process and a second type process specified for a second operation of the message-passing program module.

15. A method as defined in claim 14, wherein the relational assumption is open simulation.

16. A method as defined in claim 15, further comprising:
   checking the relational assumption between the first type process and the second type process to render a conclusion on whether the first type process simulates the second type process.

17. A method as defined in claim 16, wherein the act of checking the relational assumption comprises:
   assuming that the second type process simulates a third type process of the message-passing program module.

18. A system for evaluating behavioral properties of a message-passing program module having operations for establishing communications between the message-passing program module and other program modules, the system comprising:
   means for abstracting a behavioral module representing an intended process to be performed by an operation of the message-passing program module on a set of communication channels;

means for checking whether the behavioral module is a valid abstraction of an implementation for the operation;

if the behavioral module is deemed a valid abstraction of the implementation, evaluating behavioral properties of the behavioral module to render a conclusion concerning the behavioral properties for the implementation; and means for displaying the conclusion.

19. A system as defined in claim 18, further comprising:

means for specifying a type annotation at the operation, the type annotations being a communication protocol that represents the intended process to be performed by the operation on the set of communication channels, wherein the type annotations are used to abstract the behavioral module.

20. A system as defined in claim 19, further comprising:

means for checking whether conformance exists between the implementation and the type annotation.

21. A system as defined in claim 20, wherein the intended process specifies intended input and output actions that the implementation is to perform on the set of communication channels.

22. A computer storage media encoding a computer program of instructions for executing a computer process for controlling operations of the computing system and for modeling behavior of a message-passing program module having operations responsible for establishing communications between the message-passing program module and other program modules, the computer process comprising:

specifying a first type process reflecting intended message-passing behavior of an operation of the message-passing program module, wherein the first type process is expressed as a type annotation;

compiling the message-passing program module to render an implementation for the operation;

defining a conformance relation for checking conformance between the implementation and the type annotation;

checking the implementation against the first type process to determine whether the implementation satisfies the conformance relation with respect to the type annotation;

if the implementation does not satisfy the conformance relation, rendering an error message that the message-passing application program is not well-implemented; and if the implementation does satisfy the conformance relation, displaying a valid message indicating that the message-passing application program is well-implemented.

23. The computer process in the computer program product of claim 22, wherein the conformance relation is open simulation.

24. The computer process in the computer program product of claim 22, wherein the specifying act comprises:

defining a set of communication channels for performance of the first type process.

25. The computer process in the computer program product of claim 24, wherein the computer process further comprises:

if the implementation satisfies the conformance relation, abstracting a behavioral model reflecting message-passing actions required the first type process.

26. The computer process in the computer program product of claim 25, wherein the abstracting act comprises:

discarding information contained in the first type process that does not relate to an action performed on a channel of the set of communication channels for the first type process.

27. The computer process in the computer program product of claim 25, wherein the computer process further comprises:

abstracting subtyping obligations defining a relational assumption between the first type process and a second type process specified for a second operation of the message-passing program module.

28. The computer process in the computer program product of claim 27, wherein the relational assumption is open simulation.

29. The computer process in the computer program product of claim 28, wherein the computer process further comprises:

checking the relational assumption between the first type process and the second type process to render a conclusion on whether the first type process simulates the second type process.

* * * * *